(12) United States Patent
Stanich et al.

(10) Patent No.: US 10,902,304 B1
(45) Date of Patent: Jan. 26, 2021

(54) OPTICAL DENSITY MONITORING MECHANISM

(71) Applicants: Mikel Stanich, Longmont, CO (US); Nikita Gurudath, Boulder, CO (US)

(72) Inventors: Mikel Stanich, Longmont, CO (US); Nikita Gurudath, Boulder, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/804,875

(22) Filed: Feb. 28, 2020

(51) Int. Cl.
*G06K 15/02* (2006.01)

(52) U.S. Cl.
CPC ... *G06K 15/027* (2013.01); *G06K 2215/0017* (2013.01)

(58) Field of Classification Search
CPC .......... G06K 15/1881; G06K 15/1878; G06K 15/027; G06K 2215/0094; G06K 15/1872; G06K 2215/0097; G06K 9/46; G06K 15/102; G06K 2215/0074; G06K 15/07; G06F 3/1208; G06F 3/1242; H02P 27/06; H02P 6/18; H02P 6/20; H02P 6/22;
(Continued)

(56) References Cited

U.S. PATENT DOCUMENTS 5,729,786 A * 3/1998 Yamada ............. G03G 15/5041
399/42
6,147,698 A * 11/2000 Zable ................... H04N 1/4078
347/240
(Continued)

FOREIGN PATENT DOCUMENTS

EP 0454448 10/1991
EP 2313272 B1 2/2010
(Continued)

OTHER PUBLICATIONS

Rius, M., Casaldàliga, M., Vargas, X. F., Quintero, X., Segura, R., & del Vallès, S. C. (Jan. 2015). Printer Calibrations for HP Large Format Page Wide Technology. In NIP & Digital Fabrication Conference (vol. 2015, No. 1, pp. 326-331). Society for Imaging Science and Technology.

(Continued)

*Primary Examiner* — Negussie Worku
(74) *Attorney, Agent, or Firm* — Jaffery Watson Mendonsa & Hamilton LLP

(57) ABSTRACT

A system is disclosed. The system at least one physical memory device to store monitoring logic and one or more processors coupled with the at least one physical memory device, to execute the monitoring logic to receive a first and a second ink deposition data representing an output ink amount versus an input digital count for each of a plurality of color planes, generate first optical density (OD) response data for each of the plurality of color planes based on the first ink deposition data, wherein the first OD response data represents a first OD value versus the input digital count, generate second OD response data for each of the plurality of color planes based on the second ink deposition data, determine whether a difference between the first OD response data and the second OD response data exceeds a predetermined threshold and transmit a signal upon a determination that the difference between the first OD response data and the second OD response data exceeds the predetermined threshold.

20 Claims, 11 Drawing Sheets

(58) Field of Classification Search
CPC .......... H04N 1/00002; H04N 1/00015; H04N 1/00023; H04N 1/00034; H04N 1/00047; H04N 1/0005; H04N 1/00055; H04N 1/00063; H04N 1/00082; H04N 1/2307; H04N 1/2346; H04N 1/407; H04N 1/58; H04N 1/6019; H04N 1/4051; H04N 1/6033; B41J 29/38; B41J 2/04516; B41J 2/04581; B41J 2/04593; B41J 2/2121; B41J 2/2128; B41J 2/2132; B41J 2/5058; B41J 3/60; B41J 2/2114; G03C 1/42; G03C 1/49827; G03C 7/413; G03C 8/408; G03C 7/3022; G03C 7/30558; G03C 8/4033; G03C 8/404; G03G 15/0889; G03G 15/50; G03G 15/5058; Y10S 430/16; B41N 1/06
USPC ....................................................... 358/504
See application file for complete search history.

(56) References Cited

U.S. PATENT DOCUMENTS

| | | | |
|---|---|---|---|
| 6,714,320 B1* | 3/2004 | Nakahara | H04N 1/4051 358/3.12 |
| 7,423,778 B2 | 9/2008 | Hersch et al. | |
| 8,100,057 B2 | 1/2012 | Hartmann et al. | |
| 8,576,450 B2 | 11/2013 | Shepherd et al. | |
| 8,734,034 B2 | 5/2014 | Morovic et al. | |
| 8,923,713 B2 | 12/2014 | Terao et al. | |
| 9,056,485 B2 | 6/2015 | Szafraniec | |
| 9,096,056 B2 | 8/2015 | Zhou et al. | |
| 9,102,157 B2 | 8/2015 | Prothon et al. | |
| 9,132,629 B2 | 9/2015 | Ward et al. | |
| 9,268,279 B1* | 2/2016 | Murayama | G03G 15/50 |
| 9,444,974 B2* | 9/2016 | Omagari | H04N 1/00002 |
| 9,656,463 B1 | 5/2017 | Ernst et al. | |
| 9,661,154 B1 | 5/2017 | Stanich et al. | |
| 9,785,873 B2 | 10/2017 | Stanich et al. | |
| 10,129,436 B2* | 11/2018 | Kimura | G03G 15/55 |
| 10,214,038 B2 | 2/2019 | Klinger et al. | |
| 10,237,452 B2 | 3/2019 | Rius Rossell et al. | |
| 10,338,496 B2 | 7/2019 | Able et al. | |
| 10,698,337 B2* | 6/2020 | Shimizu | G03G 15/5058 |
| 2002/0070990 A1* | 6/2002 | Yamasaki | H04N 1/58 347/15 |
| 2003/0179410 A1 | 9/2003 | Velde | |
| 2005/0088672 A1 | 4/2005 | Johnson | |
| 2006/0208029 A1* | 9/2006 | Suzuki | B23K 9/126 228/8 |
| 2007/0188779 A1* | 8/2007 | Nagao | H04N 1/6019 358/1.9 |
| 2009/0268254 A1* | 10/2009 | Morishita | G06K 15/107 358/3.09 |
| 2012/0050755 A1 | 3/2012 | Chandu et al. | |
| 2012/0120419 A1* | 5/2012 | Toura | H04N 1/6033 358/1.9 |
| 2013/0076815 A1* | 3/2013 | Nakano | B41J 2/04593 347/9 |
| 2013/0101328 A1 | 4/2013 | Morovic et al. | |
| 2013/0194327 A1* | 8/2013 | Hara | B41J 2/2128 347/7 |
| 2017/0080732 A1* | 3/2017 | Kasahara | B41J 2/04558 |
| 2017/0259560 A1 | 9/2017 | Sreenivasan et al. | |
| 2018/0234582 A1 | 8/2018 | Stanich et al. | |
| 2019/0268482 A1 | 8/2019 | Stanich et al. | |
| 2019/0270304 A1 | 9/2019 | Stanich et al. | |

FOREIGN PATENT DOCUMENTS

| | | |
|---|---|---|
| JP | 2018174143 | 11/2018 |
| WO | 2018022077 A1 | 2/2018 |

OTHER PUBLICATIONS

Milder, O. B., Tarasov, D. A., & Titova, M. Y. (Mar. 2017). Inkjet printers linearization using 3D gradation curves. In CEUR Workshop Proceedings. Proceedings of the 1st International Workshop on Radio Electronics & Information Technologies (REIT 2017), Yekaterinburg, Russia (vol. 1814, pp. 74-83).

Jangra, A., Verma, S. & Boora, S. (2017). Identifying the Relationship Between Solid Ink Density and Dot Gain in Digital Printing. International Research Journal of Management Science & Technology, 8(3), 15-20. doi:10.32804/IRJMST. See highlighted and underlined sections.

Alamán, J. et al. (Nov. 2016). Inkjet Printing of Functional Materials for Optical and Photonic Applications. Materials 2016, 9(910). doi:10.3390/ma9110910. See highlighted and underlined sections.

Final Office Action from U.S. Appl. No. 16/804,652, dated Nov. 10, 2020, 12 pages.

Office Action from U.S. Appl. No. 16/804,652, dated Oct. 1, 2020, 15 pages.

* cited by examiner

```
┌─────────────────────────────────────────────┐
│         INK DEPOSITION COMPUTE LOGIC         │
│                    310                       │
│                                              │
│   ┌───────────────────────────────────────┐  │
│   │ CALIBRATED INK DEPOSITION GENERATION LOGIC │
│   │                  420                   │  │
│   └───────────────────────────────────────┘  │
│                                              │
└─────────────────────────────────────────────┘
```

Figure 4A

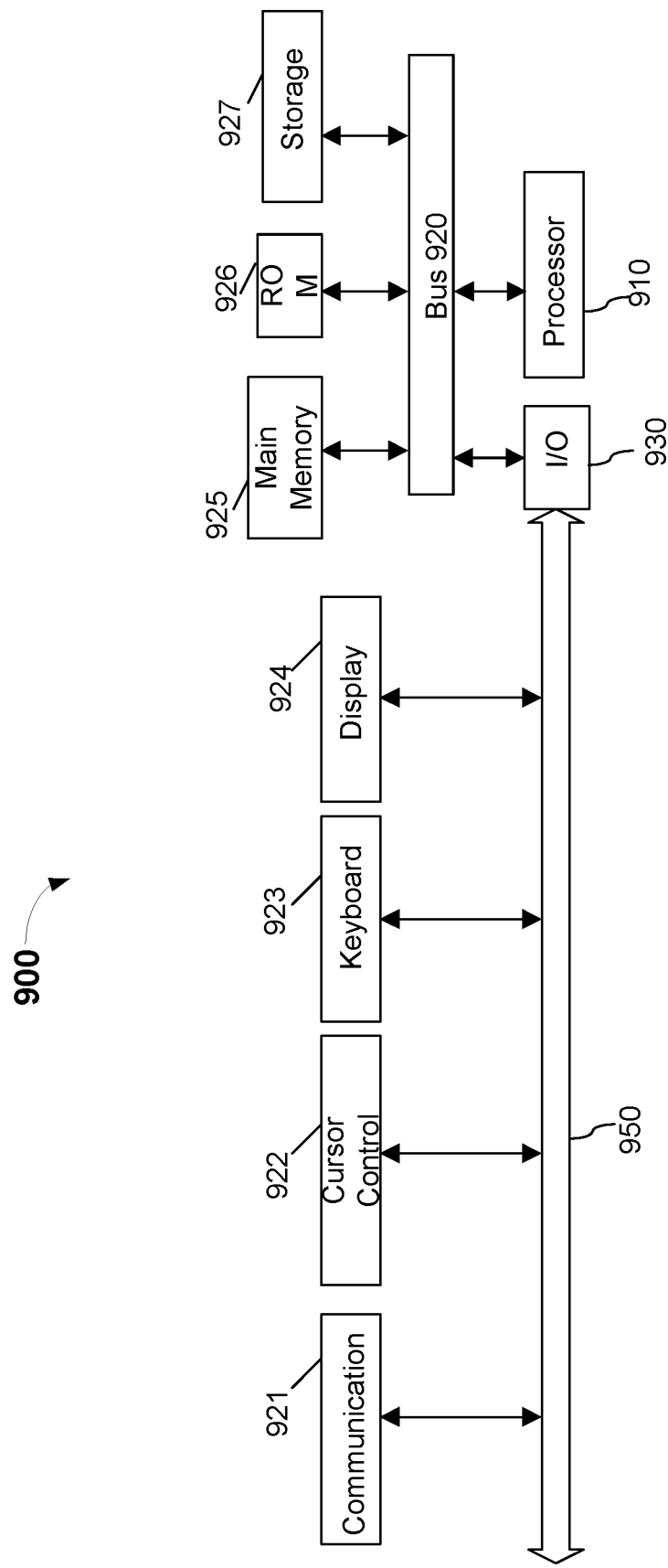

US 10,902,304 B1

OPTICAL DENSITY MONITORING MECHANISM

FIELD OF THE INVENTION

The invention relates to the field of printing systems, and in particular, to monitoring characteristics of a printing system.

BACKGROUND

In commercial and transactional printers, optical density (OD) consistency represents a critical attribute (or characteristic) of print quality. Conventional methods of measuring OD changes in a printing system involve adding specific test images to a print job to facilitate the OD measurements, dynamically performing optical measurements of the test images using test equipment to deduce OD changes, or removing specific test images and measuring offline using a spectrophotometer to process the OD values in order to track changes over time.

However, the above-described methods require additional printed pages, which results in wasted paper and ink. Further, test pages must be removed from the job and discarded, or measured offline. Such offline measurements require additional human resources, as well as the cost of measuring devices. Alternately small patches may be printed near the edge of printed sheets that are measured using a scanner or dynamic spectrophotometer. Although there is no added paper in this case, the measurements may not accurately reflect OD for over an entire printed medium.

Accordingly, an improved mechanism to monitor OD, and other printer characteristics, consistency in a printer is desired.

SUMMARY

In one embodiment, a method is disclosed. The method includes receiving a first and a second ink deposition data representing an output ink amount versus an input digital count for each of a plurality of color planes, generating first optical density (OD) response data for each of the plurality of color planes based on the first ink deposition data, wherein the first OD response data represents a first OD value versus the input digital count, generating second OD response data for each of the plurality of color planes based on the second ink deposition data, determining whether a difference between the first OD response data and the second OD response data exceeds a predetermined threshold and transmitting a signal upon a determination that the difference between the first OD response data and the second OD response data exceeds the predetermined threshold.

BRIEF DESCRIPTION OF THE DRAWINGS

A better understanding of the present invention can be obtained from the following detailed description in conjunction with the following drawings, in which:

FIG. 4A illustrates one embodiment of ink deposition compute logic;

FIG. 9 illustrates one embodiment of a computer system.

DETAILED DESCRIPTION

A mechanism to monitor printer characteristics is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
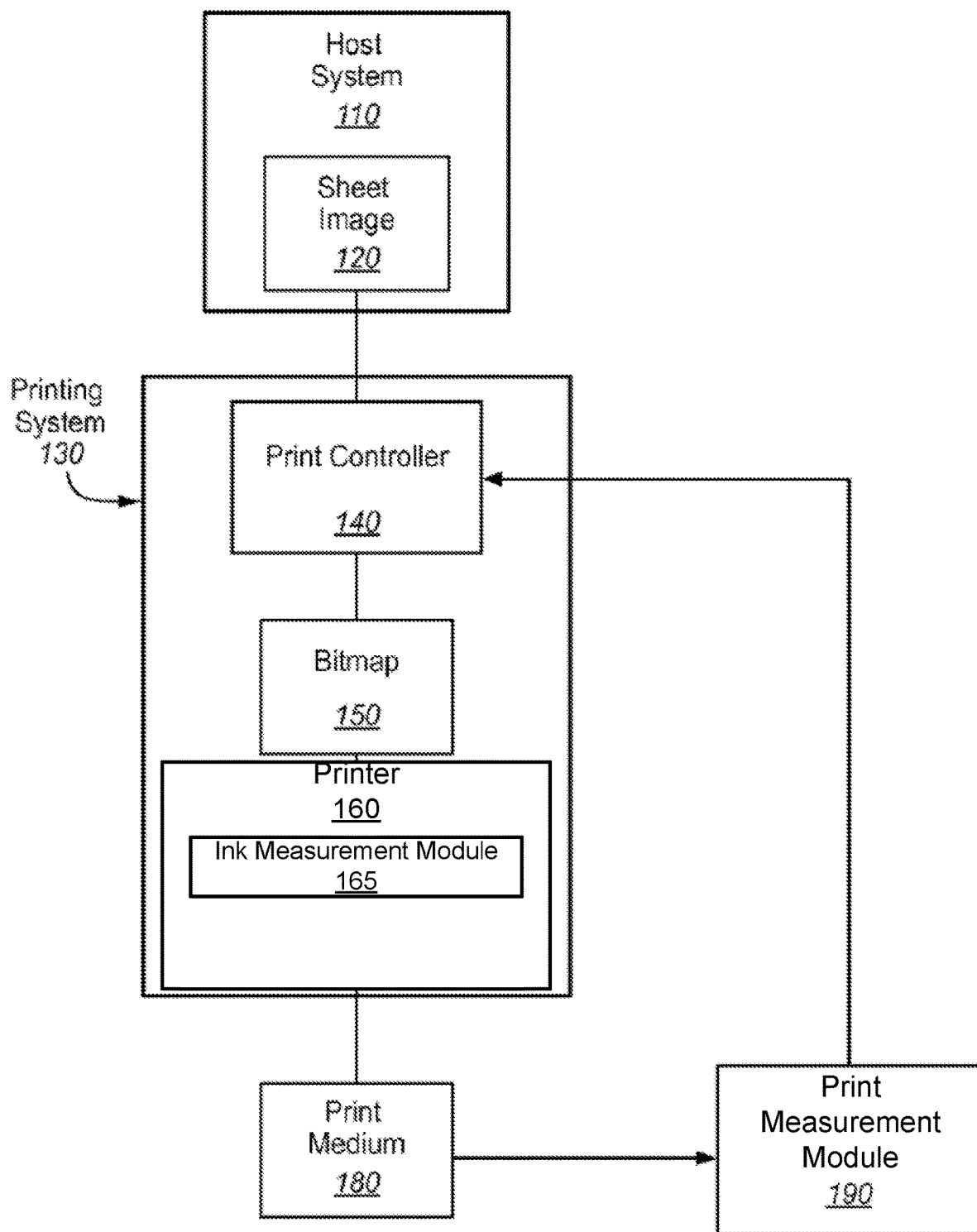
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper, textile, plastic and/or any medium suitable for printing) via a printer 160. The resulting print medium 180 may be printed in color and/or in any of number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. Print controller 140 and printer 160 may both be implemented in the same device or in separate devices with coupling.

Print measurement module 190 may be any system, device, software, circuitry and/or other suitable component operable to measure and process the spectral information of ink printed on medium 180 on a per color basis (e.g., print measurement data). In one embodiment, print measurement module 190 is implemented as a spectrophotometer to obtain print measurement data such as optical densities (OD) of the images of the test print job printed on medium 180. Print measurement module 190 communicates the print measurement data with print controller 140 to be used in processes such as determining an ink deposition curve.

An additional application of print measurement module 190 is to measure the printed output of the printer for the purpose of establishing a calibration, which when applied to the processing of the print data achieves a specific desired (e.g., target) calibrated OD. The print measurement module 190 may be a stand-alone process or be integrated into the printing system 130.

According to one embodiment, printer 160 includes an ink measurement module 165. Ink measurement module 165 may be any system, device, software, circuitry and/or other suitable component operable to measure and process ink usage by printer 160 on a per color basis (e.g., ink measurement data). In one embodiment, ink measurement data includes the total amount (volume or mass) of ink for each primary color used to print in a print interval (e.g., a specific print job or number of pages, etc.). The amount of ink may be represented with standardized measurement units of mass or volume (e.g., milligrams or milliliters). Ink measurement module 165 may include drop counting capability to count the discrete number of drops used by halftoning while printing a job. In a multibit ink-jet printer, capable of printing with four different drop sizes, this would entail counting the small, medium and large drops associated with the bitmap 150. Ink usage amounts may be calculated based on the amount of ink in each ink drop size and a count of each ink drop size in the print interval.

Ink measurement module 165 communicates the ink measurement data with print controller 140 to be used in processes such as determining ink deposition data. As will be discussed in more detail below, ink deposition is defined as an average amount of ink deposited per printed device pel, where a pel is a picture element of the printer 160 (e.g., the printing device). In one embodiment, the amount of ink deposition changes as a function of digital count, where digital count is the gray level representing the pels in the bitmap 150. In such an embodiment, the pels in bitmap 150 ranges from 0-255 for a typical 8 bit system. Additionally, the digital count is a control parameter of the output pel.

In one embodiment, an ink deposition curve is the ink deposition defined over the range of all possible gray levels (e.g., 0-255). In such an embodiment, ink deposition is computed on an average basis to eliminate local variations due to halftoning using a set of discrete drop sizes. Ink drop sizes may be determined by analyzing the amount of ink used and counts of ink drops of each size, from ink measurement module 165 during printing over the same print interval.

The ink measurement module 165 may include any combination of pumps, flow meters, weighing devices, ink drop counters, ink drop size data and associated processing suitable to generate ink measurement data. Additionally, ink measurement module 165 may be a stand-alone process or be integrated into the printer 160.

Figure 2A:
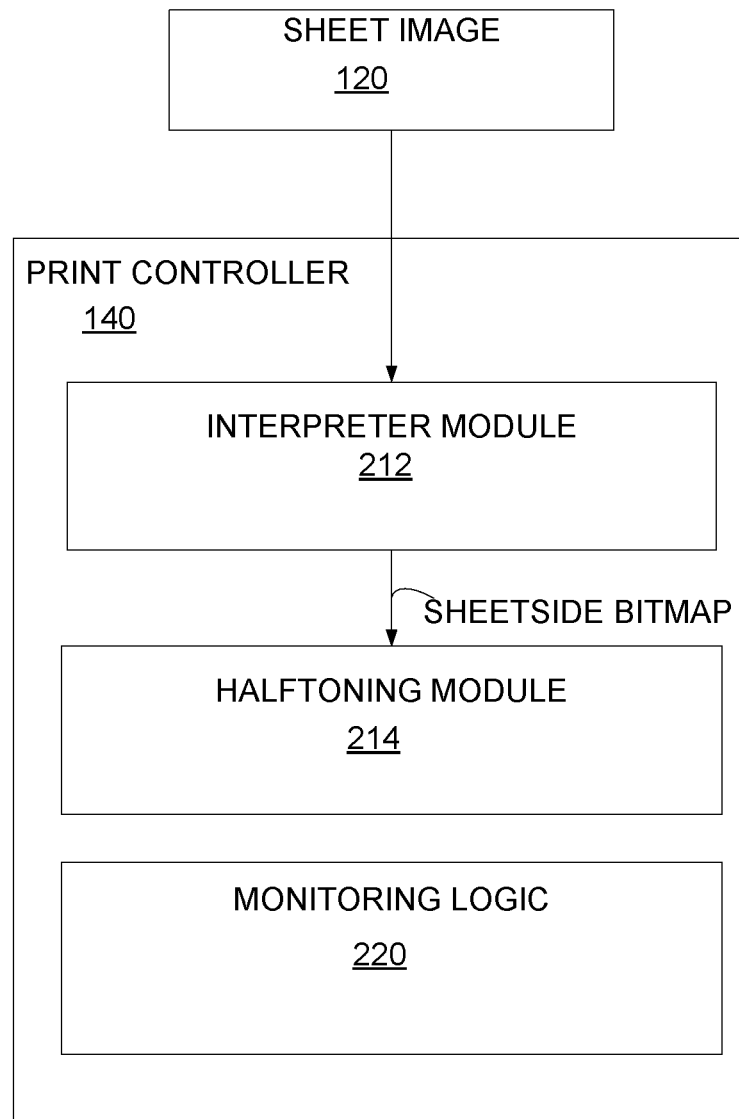
FIGS. 2A&2B are block diagrams illustrating embodiment of a print controller.
Figure 2B:
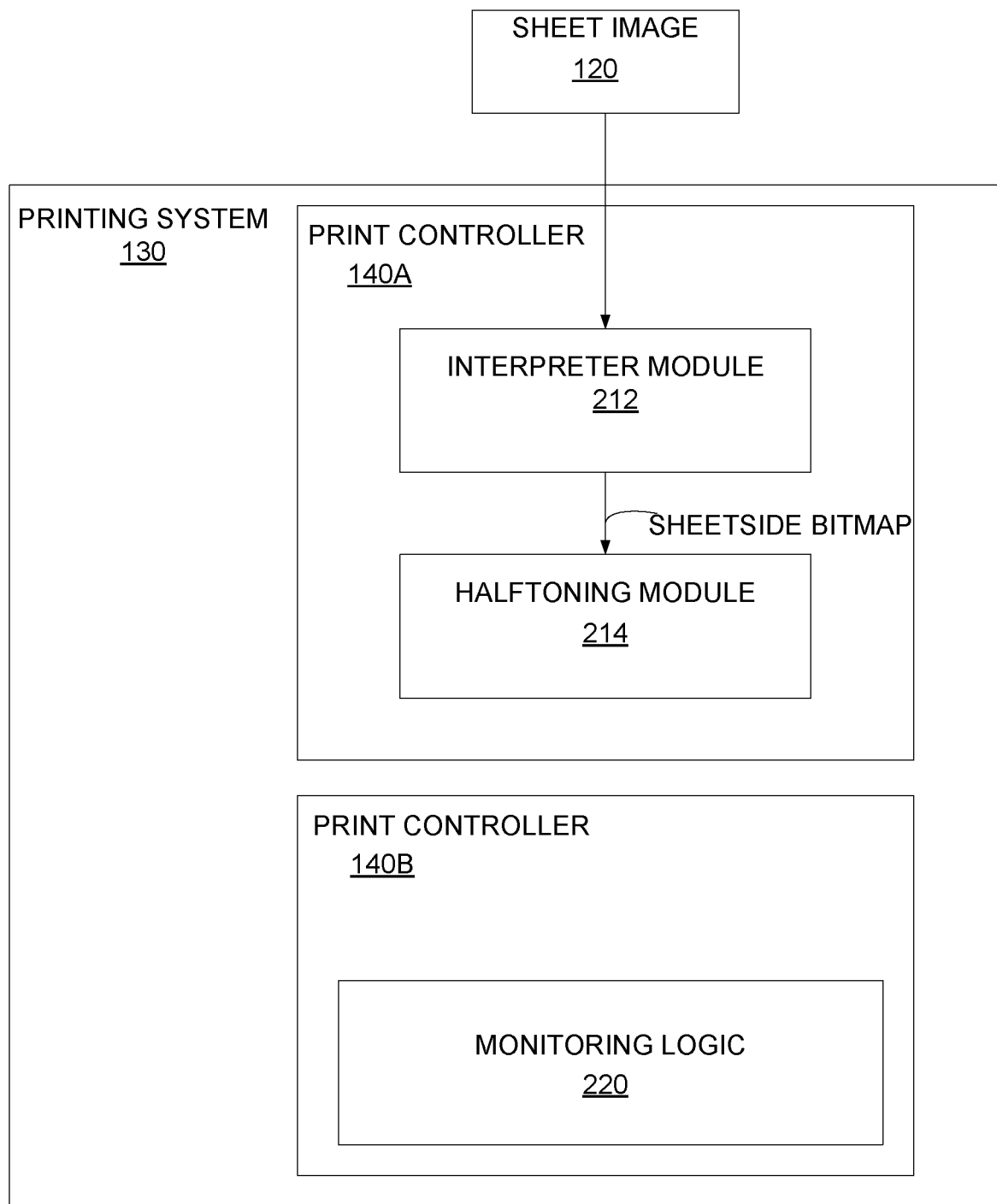

FIGS. 2A&2B illustrate embodiments implementing print controllers 140. FIG. 2A illustrates a print controller 140 (e.g., DFE or digital front end), in its generalized form, including interpreter module 212, halftoning module 214 and monitoring logic 220, while FIG. 2B illustrates an embodiment having print controllers 140A&140B. In this embodiment, print controller 140A includes interpreter module 212 and halftoning module 214, and print controller 140B includes monitoring logic 220. Print controllers 140A and 140B may be implemented in the same printing system 130 (as shown) or may be implemented separately.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pels representing an image of the print job (e.g., a Continuous Tone Image (CTI)), also referred to as full sheetside bitmaps. The 2-dimensional pel arrays are considered "full" sheetside bitmaps because the bitmaps include the entire set of pels for the image.

Interpreter module 212 is operable to interpret or render multiple raw sheetsides concurrently so that the rate of rendering substantially matches the rate of imaging of production print engines. In one embodiment, the rate of rendering does not apply to stand alone ink estimation components since it is not actually driving a printer. In such an embodiment, the only requirement is producing an estimate in a reasonable amount of time. Halftoning module 214 is operable to represent the sheetside bitmaps as halftone patterns of ink. For example, halftoning module 214 may convert the pels to halftone patterns of CMYK ink for application to the paper. In the case of multibit halftoning in an ink-jet printer, the patterns are different sized drops. The specific drop sizes are determined by a halftoning algorithm, employing multibit threshold arrays.

Monitoring logic 220 is implemented to monitor printing system 130 based on characteristic data. According to one embodiment, monitoring logic 220 generates printer characteristic data for each of the plurality of color planes based on corresponding ink deposition data. Thus, the printer characteristic data represents an output printer characteristic value versus an input digital count. In a further embodiment, monitoring logic 220 continuously monitors the characteristic data based on print measurement updates received from print measurement module 190, as well as the received ink drop counts received from ink measurement module 165.

In one embodiment, the printer characteristic data comprises the ink deposition data. Thus, in this embodiment, monitoring logic 220 performs printer ink deposition monitoring (PIDM) to detect excessive variations and trends in the monitored ink deposition data, which may indicate potential issues that are occurring in the printer. As will be discussed in more detail below, PIDM may be performed using calibrated or uncalibrated ink deposition. Uncalibrated ink deposition differences and drop sizes indicate how the basic printer is performing without correction.

In another embodiment, the printer characteristic data comprises OD response data, which enables monitoring logic 220 to perform non-optical printer density monitoring" (NOPDM). As will be discussed in more detail below, NOPDM may be performed using calibrated or uncalibrated OD. Although calibrated OD changes are most significant, because it indicates how the printer is performing as perceived by a user, uncalibrated OD differences and drop size changes indicate how the basic printer is performing without compensation. Compensation refers to modification of digital counts using a transfer function. As discussed above with reference to ink deposition, excessive variations and trends in monitored response OD data indicate potential issues that are occurring in the printer.

Figure 3:
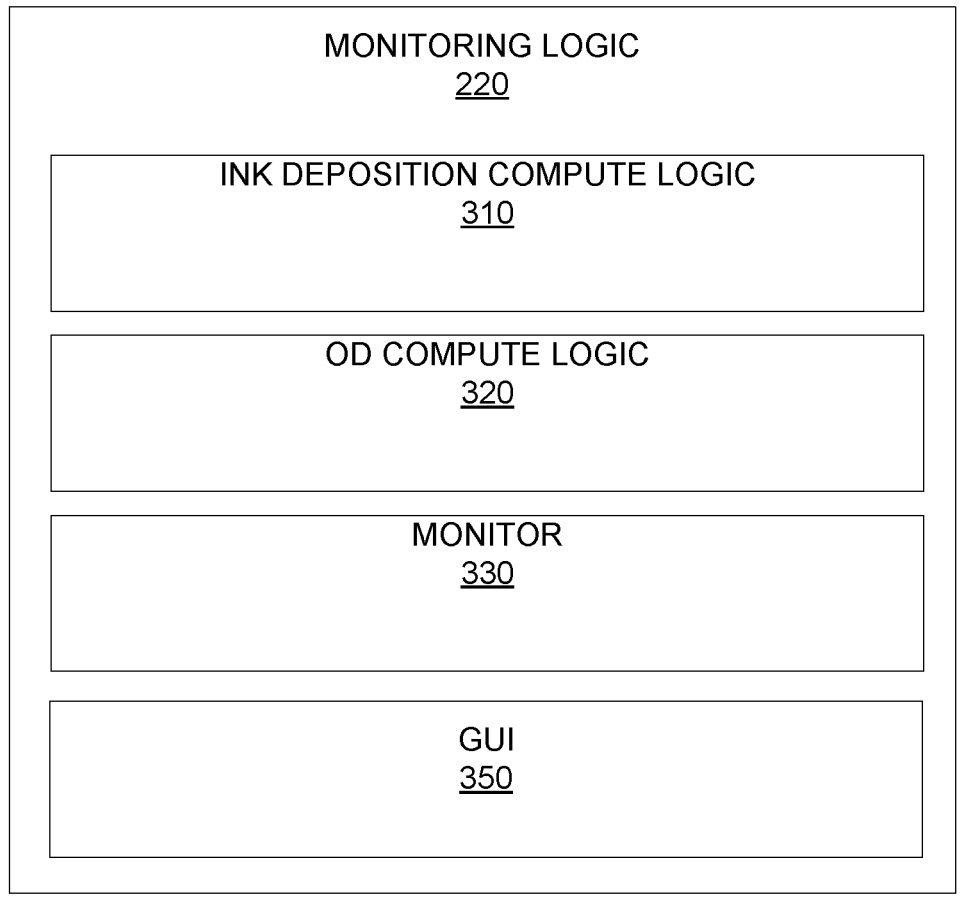
FIG. 3 illustrates one embodiment of characteristic monitoring logic.

FIG. 3 illustrates one embodiment of monitoring logic 220, including ink deposition compute logic 310, OD compute logic 320 and monitor 330. Ink deposition compute logic 310 is implemented to compute calibrated ink deposition data. FIG. 4A illustrates one embodiment of ink deposition compute logic 310, which includes calibrated ink deposition generation logic 420. According to one embodiment, calibrated ink deposition generation logic 420 computes calibrated ink deposition data based on received uncalibrated ink deposition data, where ink deposition data may be represented as one or more data ink deposition curves and/or tables.

In a further embodiment, the calibrated ink deposition data is generated using a direct deposit process. In such an embodiment, the direct deposit process provides a direct conversion of uncalibrated ink deposition data to calibrated ink deposition data using a print engine calibrated transfer function (or transfer function) by mapping an input digital count to an output digital count. The uncalibrated ink deposition data represents a mapping of the input digital count to an amount of ink deposition, corresponding to the respective digital count value. Thus, the direct deposit process uses a print engine calibration transfer function to transform preliminary uncalibrated ink deposition data into calibrated ink deposition data (e.g., ink deposition tables). Direct deposit transforms digital count values using the engine calibration transfer function. The transformed values are then used as new digital count inputs for the uncalibrated ink deposition, to obtain calibrated ink depositions versus digital count. In this case the transfer function is determined to obtain a calibrated OD response.

The calibrated ink deposition represents an amount of ink deposition the printer employs when printing employing a transfer function to achieve a calibrated target OD response, while the uncalibrated ink deposition is the amount of ink deposition the printer employs when printing takes place using an identity transfer function (e.g., without compensation to achieve a calibrated response). According to one embodiment, no information regarding the target OD response is required in the direct deposit process. This occurs when calibration does not have explicit target ODs, such as the case for near neutral calibration methods.

In yet a further embodiment, the uncalibrated print engine response (e.g., OD expressed as a function of digital count) may be converted into a calibrated print engine response by transforming the uncalibrated print engine response with the transfer function (TF). For example, given OD (DC) as representing an uncalibrated optical density (OD) of the printer vs digital count, DC'=TF(DC) defines a transformation of digital count levels using a print engine calibration transfer function (TF) to produce modified levels (DC'), where TF is computed to transform the OD into a calibrated printer response OD'. If the function T(DC) represents the target OD response after calibration, then the transfer function TF(DC)=DC'=OD$^{-1}$ (T(DC)). Where OD$^{-1}$ is the inverse function of the uncalibrated measured OD function.

Based on the above, OD'(DC)=OD(TF(DC)), where OD' is the calibrated target response of the printer. In a further embodiment, a printer functional relationship (e.g., XX(DC), where DC is the uncalibrated printer values) may be transformed into a calibrated printer relationship (XX') by using the transfer function. Thus, ID'(DC)=ID(TF(DC)) provides an updated (or current) calibrated ink deposition data (ID') derived from the uncalibrated ink deposition ID and the printer transfer function.

In one embodiment, the uncalibrated ink deposition data is received from a storage device, such as memory. In another embodiment, the uncalibrated ink deposition data may be generated by iteratively measuring actual ink usage (e.g., ink measurement data), comparing the actual ink usage to an ink estimate and adjusting the uncalibrated ink deposition data until the ink estimate matches the actual ink usage within an acceptable error threshold.

Figure 4B:
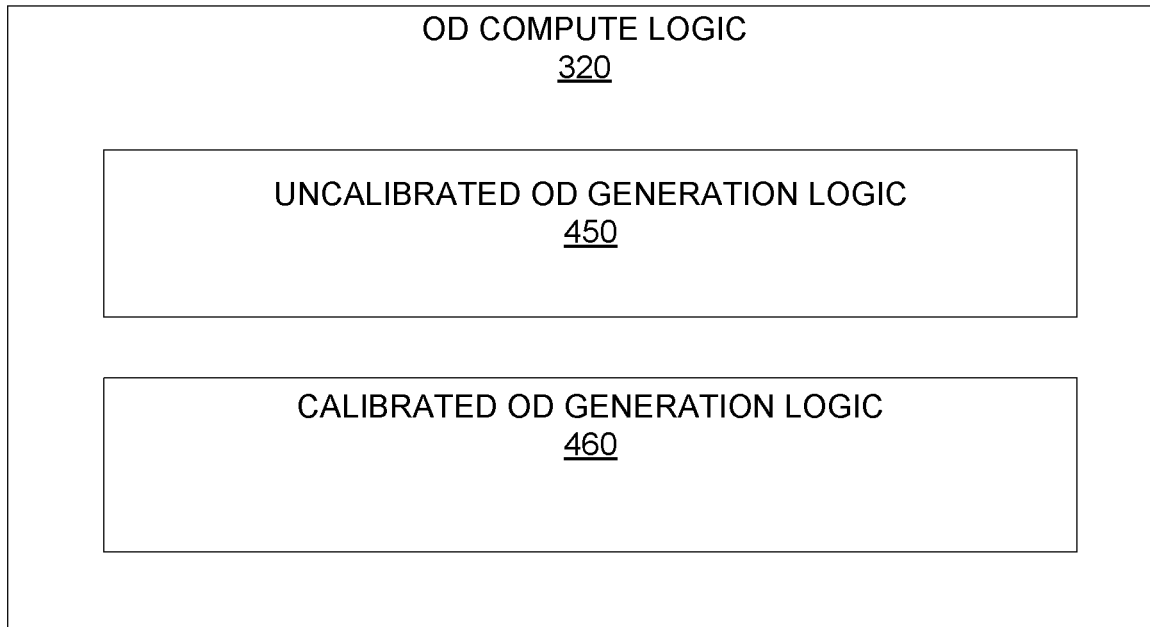
FIG. 4B illustrates one embodiment of OD compute logic.

Referring back to FIG. 3, OD compute logic 320 is implemented to generate the OD response data. In one embodiment, the OD response data comprises an OD versus digital count. FIG. 4B illustrates one embodiment of OD compute logic 320 including uncalibrated OD generation logic 450 and calibrated OD generation logic 460. Uncalibrated OD generation logic 450 generates uncalibrated OD response data using uncalibrated ink deposition data, while calibrated OD generation logic 460 generates calibrated OD response data using calibrated ink deposition data.

For both uncalibrated and calibrated embodiments, OD response data is generated by applying an ink model, such as the Weibull ink model regression, to create a relationship between OD and the ink deposition data. Weibull cumulative distribution function (CDF) describes the probability that a real-valued random variable X with a given probability will be found at a value less than or equal to x (where x is a one possible value of the random variable X). Intuitively, it is the "area under the curve" function of the probability density function (PDF). Cumulative distribution functions are also used to specify the distribution of multivariate random variables. The Weibull CDF model that is employed uses two parameters.

In one embodiment, the Weibull CDF is modified to incorporate paper white and the solid area maximum optical density. This modified Weibull CDF will be described as simply "Weibull CDF". The forward Weibull CDF relates ink deposition to OD, while the inverse Weibull CDF relates OD to ink deposition. In one embodiment, ink deposition (or ink coverage) is represented by:

$$\text{Ink Coverage} = \frac{\text{Total Ink Mass}}{\text{Area}},$$

$$\text{Total Ink Mass} = \sum_{Area} \text{Drop sizes milligrams}$$

In one embodiment, a four parameter Weibull ink model is implemented using OD=$(p(3)*(1-\exp^{((-(x/p(1))[<]BEGINI_{TALmp(2)})))}+p(4)$. In such an embodiment, the two-parameter classical Weibull CDF function has been extended to four parameters to create a paper-ink model. The two additional parameters allow the model to account for paper white and absolute paper referenced OD, where x=ink deposition mass per area, p(1)=ink mass per area scale factor, which is similar to the classical Weibull scale factor in the way it influences the shape of the function, p(2)=slope factor.

This factor influences the shape of the function similarly to the classical Weibull slope factor, p(3)=maximum paper referenced OD and p(4)=paper white OD. Slope factors p(1) and p(2) are the parameters used in the classical two parameter Weibull CDF function. The p(1) scale factor adjusts the shape of the curve so as to modify how much ink deposition is required to achieve various ODs. Larger values for p(1) require more ink deposition to achieve the same OD.

In addition, since p(1) is similar to two-parameter classical Weibull slope, it indicates the point of the curve where the ink deposition is approximately 63% of the paper referenced OD, parameter p(3). The model provides a value for the maximum absolute OD for the ink/paper. This maximum OD will be given by the sum of the p(3) and p(4) parameters. This maximum OD would occur at infinite values of ink deposition.

Based on the Weibull CDF parameters, OD ink OD response data may be generated using calibrated/uncalibrated ink deposition data. In other embodiments, the response data may be represented using CIE L*a*b* rather than OD. In such an embodiment, CIE L*a*b* is implemented to provide Delta E calculations. Alternate ink models, like the Weibull model described previously, can be used to describe the relationship between CIE L*a*b* and ink deposition. For example L* versus ink deposition can use the same equation, by modifying the definitions for p(3) and p(4) to use L* values instead of OD. The alternate model predicts decreased L* values with increased ink deposition x. A second order function, alone or combined with a Weibull like equation, can be used to describe a* and b* vs ink deposition.

Referring back to FIG. 3, monitor 330 is implemented to monitor the printer characteristics data (e.g., ink deposition, OD response, CIE L*a*b* and/or ink amounts for ink drop sizes). In one embodiment, monitor 330 saves baseline characteristics data that is used to compare with real time characteristics data in order to determine variations and trends that may indicate potential issues occurring at a printer. In ink deposition embodiments, the baseline characteristics data may include baseline calibrated ink deposition data, or baseline uncalibrated ink deposition and/or baseline drop sizes. In OD embodiments, the baseline characteristics data may include baseline calibrated OD response data, baseline uncalibrated OD response data, or baseline drop sizes.

According to one embodiment, monitor 330 computes a difference between the current measured real time characteristics data and the baseline characteristics data and determines whether the computed difference exceeds a predetermine threshold. In such an embodiment, monitor 330 saves for reference the characteristics data upon determining that the computed difference does not exceed the threshold. However, monitor 330 may transmit a signal upon determining that the computed difference exceeds the threshold. The signal may indicate the printer is to stop printing operations, a warning and/or an error message. Printer 160 may receive the transmitted signal and process it. Additionally, or alternatively, monitor 330 may transmit an error message to be displayed at a graphical user interface (GUI) 350. In this case, printing may continue with a posted error condition to warn the user that OD variations from nominal exceed predetermined thresholds.

Figure 5:
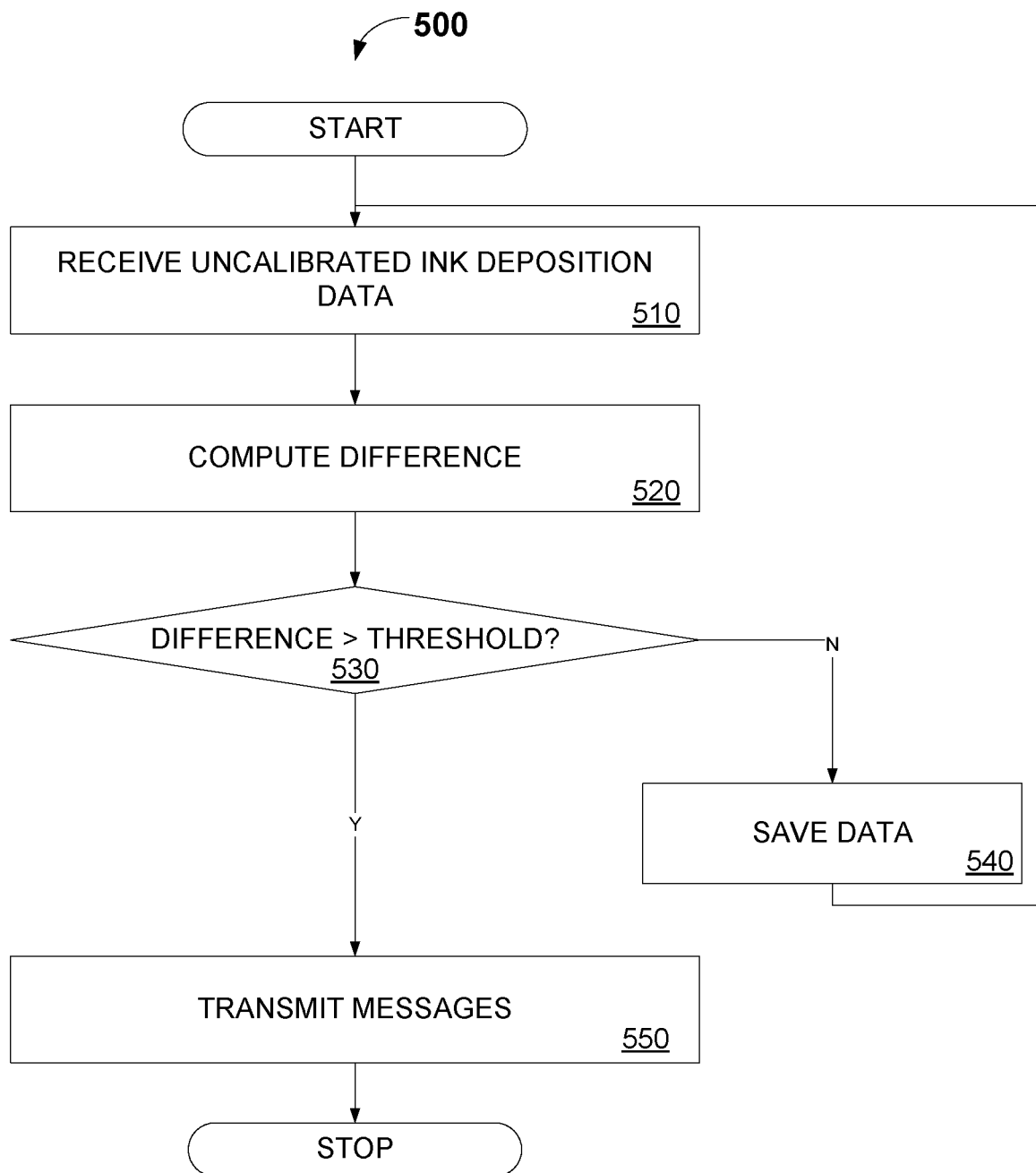
FIG. 5 is a flow diagram illustrating one embodiment of a process for monitoring printer characteristic data.

FIG. 5 is a flow diagram illustrating one embodiment of a process 500 for monitoring uncalibrated ink deposition data. Process 500 may be performed by processing logic that may comprise hardware (e.g., circuitry, dedicated logic, programmable logic, etc.), software (such as instructions run on a processing device), or a combination thereof. In one embodiment, process 500 may be performed by monitoring logic 220. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where uncalibrated ink deposition data may be received or otherwise generated. The uncalibrated ink deposition data may be generated according to ink drop sizes. The uncalibrated ink deposition may be derived by analyzing the halftone multibit threshold array. In this process the halftone design, which defines the symbolic drop sizes at each digital count, employs the actual drop sizes for each pel. This replaces the symbolic drops with actuals. The result is the actual amount of printed ink at each digital count level. This amount of ink corresponds to the area of the threshold array. Therefore, the uncalibrated ink deposition is the amount of ink divided by the area of the threshold array. This is the average amount of ink vs digital count, which is representative of any printed pel having that digital count level. Halftoning creates a variation in patterns over the gray levels defined by the range of digital count levels. The range extends from no ink at digital count level zero, to maximum ink deposition at the end of the tone range. Maximum amount of ink deposition, for example, would occur when a large drop is printed at every pel of the threshold array. Using this process with different sets of drop sizes, multiple uncalibrated ink deposition curves can be determined as a function of drop size set.

At processing block 520, a difference between the uncalibrated ink deposition data and baseline uncalibrated ink deposition data is computed. In one embodiment, the baseline data is generated by saving initial characteristics data (e.g., uncalibrated/calibrated ink deposition data or uncalibrated/calibrated OD response data, that has previously been generated.

At decision block 530, a determination is made as to whether the computed difference is greater than a predetermined threshold. If not, the uncalibrated ink deposition data is saved, processing block 540. Subsequently, control is returned to processing block 510, where subsequent uncalibrated ink deposition data is received. Upon a determination at decision block 530 that the computed difference is greater than the predetermined threshold, one or more signals (or messages) (e.g., error message and/or message to stop printing operations) are transmitted, processing block 550.

Figure 6:
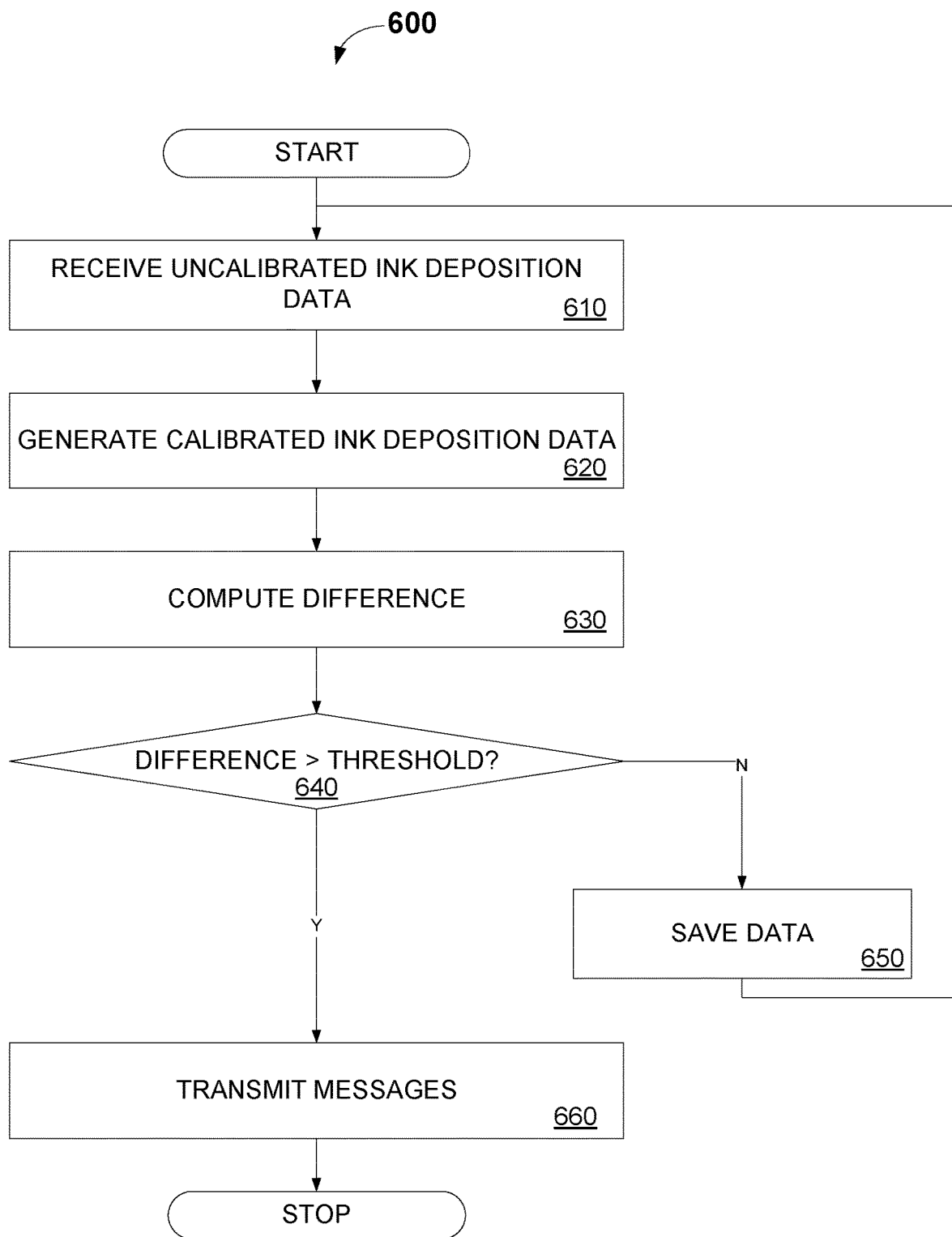
FIG. 6 is a flow diagram illustrating another embodiment of a process for monitoring printer characteristic data.

FIG. 6 is a flow diagram illustrating an embodiment of a process 600 for monitoring calibrated ink deposition data. Process 600 may be performed by processing logic that may comprise hardware (e.g., circuitry, dedicated logic, programmable logic, etc.), software (such as instructions run on a processing device), or a combination thereof. In one embodiment, process 600 may be performed by monitoring logic 220. The process 600 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-5 are not discussed or repeated here.

Process 600 begins at processing block 610, where the uncalibrated ink deposition data may be received or otherwise generated. At processing block 620, calibrated ink deposition data is generated. As discussed above, the calibrated ink deposition data is data is generated by performing a direct conversion of the uncalibrated ink deposition data to generate calibrated ink deposition data. This process uses modified digital count values transformed by the transfer function as inputs to the uncalibrated ink deposition data to generate calibrated ink deposition. At processing block 630, a difference between the calibrated ink deposition data and baseline calibrated ink deposition data is computed.

At decision block 640, a determination is made as to whether the computed difference is greater than a predetermined threshold. If not, the calibrated ink deposition data is saved, processing block 650, and control is returned to processing block 610, where subsequent uncalibrated ink deposition data is received. Upon a determination at decision block 640 that the computed difference is greater than the predetermined threshold, the one or more signals are transmitted, processing block 660.

Figure 7:
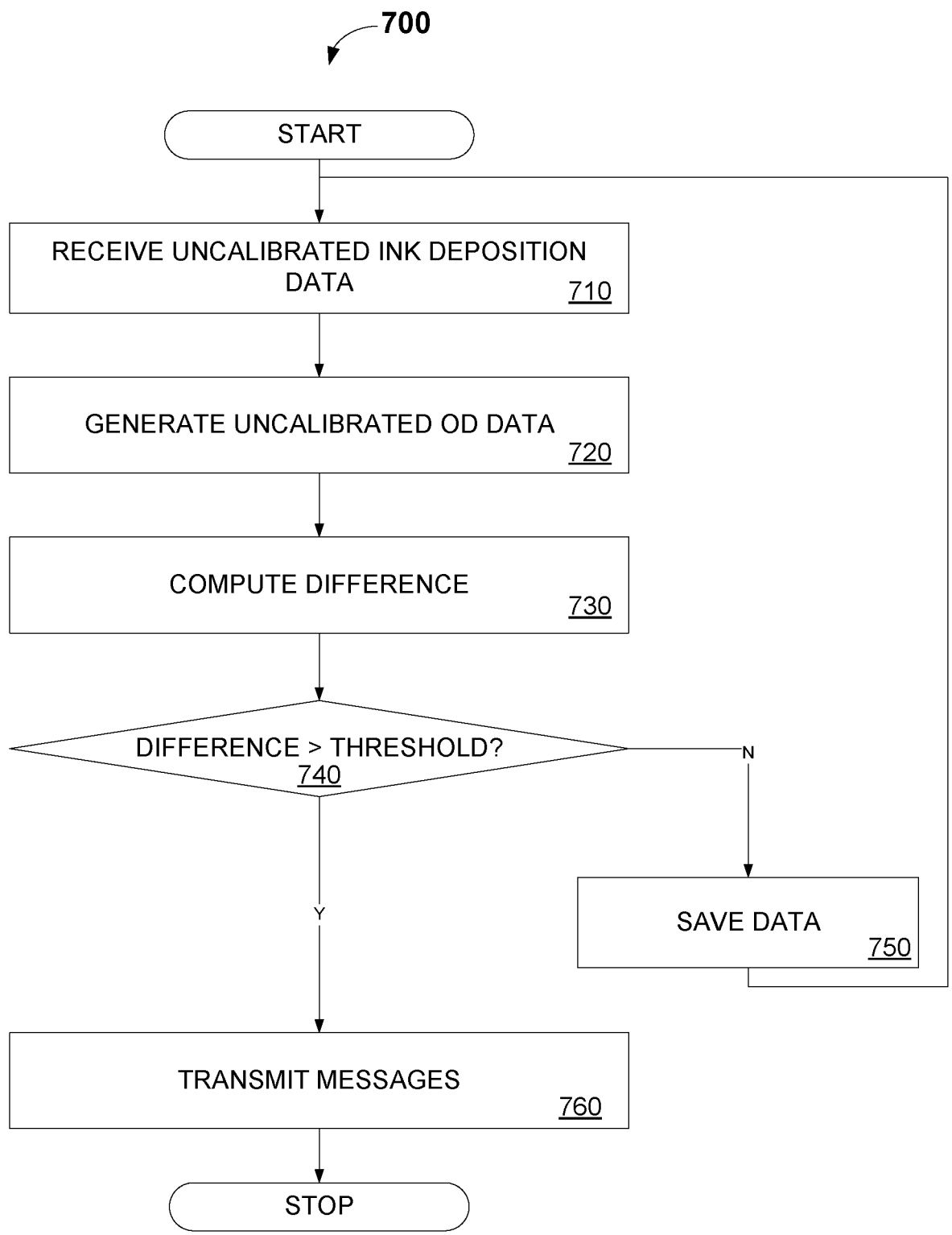
FIG. 7 is a flow diagram illustrating yet another embodiment of a process for monitoring printer characteristic data.

FIG. 7 is a flow diagram illustrating one embodiment of a process 700 for monitoring uncalibrated OD response data. Process 700 may be performed by processing logic that may comprise hardware (e.g., circuitry, dedicated logic, programmable logic, etc.), software (such as instructions run on a processing device), or a combination thereof. In one embodiment, process 700 may be performed by monitoring logic 220. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins at processing block 710, where the uncalibrated ink deposition data may be received or otherwise generated. At processing block 720, uncalibrated OD response data is generated. As discussed above, the uncalibrated OD response data is generated by applying a Weibull ink model, using the uncalibrated ink deposition data as the input. At processing block 730, a difference between the uncalibrated OD response data and baseline uncalibrated OD response data is computed.

At decision block 740, a determination is made as to whether the computed difference is greater than a predetermined threshold. If not, the uncalibrated OD response data is saved, processing block 750, and control is returned to processing block 710, where subsequent uncalibrated ink deposition data is received. Upon a determination at decision block 740 that the computed difference is greater than the predetermined threshold, the one or more signals are transmitted, processing block 760.

Figure 8:
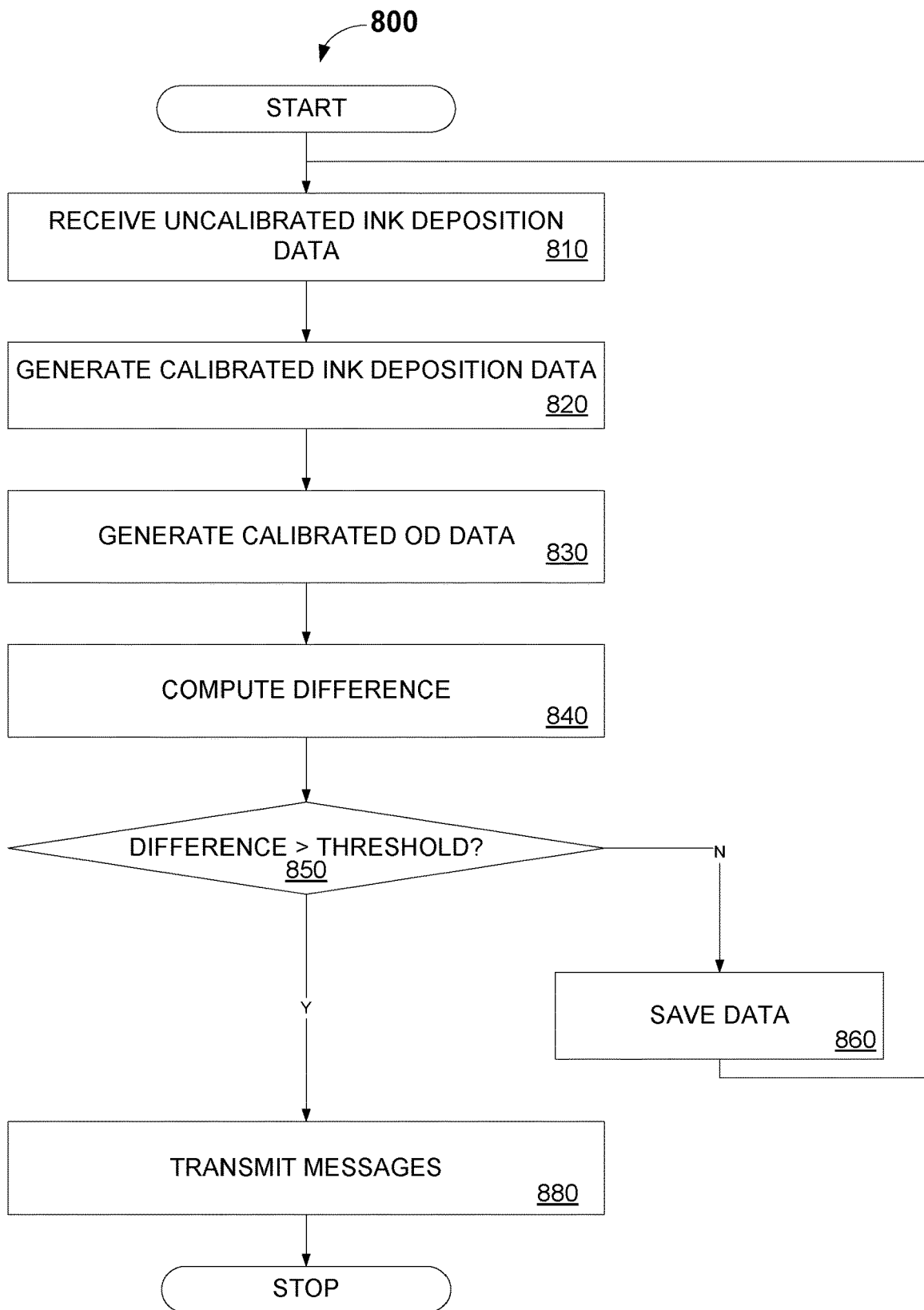
FIG. 8 is a flow diagram illustrating still another embodiment of a process for monitoring printer characteristic data.

FIG. 8 is a flow diagram illustrating one embodiment of a process 800 for monitoring calibrated OD response data. Process 800 may be performed by processing logic that may comprise hardware (e.g., circuitry, dedicated logic, programmable logic, etc.), software (such as instructions run on a processing device), or a combination thereof. In one embodiment, process 800 may be performed by monitoring logic 220. The process 800 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-7 are not discussed or repeated here.

Process 800 begins at processing block 810, where the uncalibrated ink deposition data may be received, or otherwise generated. At processing block 820, calibrated ink deposition data is generated. At processing block 830, calibrated OD response data is generated. As discussed above, the calibrated OD response data is generated by applying a Weibull ink model, using the calibrated ink deposition data as the input. At processing block 840, a difference between the calibrated OD response data and baseline calibrated OD response data is computed.

At decision block 850, a determination is made as to whether the computed difference is greater than a predetermined threshold. If not, the calibrated OD response data is saved, processing block 860, and control is returned to processing block 810, where subsequent uncalibrated ink deposition data is received. Upon a determination at decision block 850 that the computed difference is greater than the predetermined threshold, the one or more signals are transmitted, processing block 880.

FIG. 9 illustrates a computer system 900 on which printing host 110, printing system 130 and/or print controller 140 may be implemented. Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by one or more processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard 923 (e.g., alphanumeric input device) and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
    at least one physical memory device to store monitoring logic; and
    one or more processors coupled with the at least one physical memory device, to execute monitoring logic to:
        receive first ink deposition data representing an output ink amount versus a first input digital count for each of a plurality of color planes in a first halftone design;
        receive second ink deposition data representing a second output ink amount versus a second input digital count for each of the plurality of color planes in a second halftone design;
        generate first optical density (OD) response data for each of the plurality of color planes based on the first ink deposition data, wherein the first OD response data represents a first OD value versus the first input digital count for the first halftone design;
        generate second OD response data for each of the plurality of color planes based on the second ink deposition data, wherein the second OD response data represents a second OD value versus the second input digital count for the second halftone design;
        determine whether a difference between the first OD response data and the second OD response data exceeds a predetermined threshold; and
        transmit a signal upon a determination that the difference between the first OD response data and the second OD response data exceeds the predetermined threshold.

2. The system of claim 1, wherein the monitoring logic generates the first and second ink deposition data.

3. The system of claim 1, wherein the monitoring logic does not transmit the signal upon a determination that the difference between the first OD response data and the second OD response data does not exceed the predetermined threshold.

4. The system of claim 1, wherein generating the first and second OD response data comprises applying an ink model to the ink deposition data.

5. The system of claim 4, wherein the ink model comprises a Weibull distribution function.

6. The system of claim 1, wherein generating the first and second OD response data further comprises receiving uncalibrated ink deposition data, receiving a transfer function, performing a direct conversion of the uncalibrated ink deposition data to generate calibrated ink deposition data by applying the transfer function to the uncalibrated ink deposition.

7. The system of claim 6, wherein the transfer function comprises a mapping of input digital count to output digital count of the system.

8. The system of claim 1, further comprising a print controller comprising the physical memory device and the one or more processors to execute the printer monitoring logic.

9. At least one computer readable medium having instructions stored thereon, which when executed by one or more processors, cause the processors to:
    receive first ink deposition data representing an output ink amount versus a first input digital count for each of a plurality of color planes in a first halftone design;
    receive second ink deposition data representing a second output ink amount versus a second input digital count for each of the plurality of color planes in a second halftone design;
    generate first optical density (OD) response data for each of the plurality of color planes based on the first ink deposition data, wherein the first OD response data represents a first OD value versus the first input digital count for the first halftone design;
    generate second OD response data for each of the plurality of color planes based on the second ink deposition data, wherein the second OD response data represents a second OD value versus the second input digital count for the second halftone design;
    determine whether a difference between the first OD response data and the second OD response data exceeds a predetermined threshold; and
    transmit a signal upon a determination that the difference between the first OD response data and the second OD response data exceeds the predetermined threshold.

10. The computer readable medium of claim 9, having instructions stored thereon, which when executed by the one or more processors, further cause the processors to generate the first and second ink deposition data.

11. The computer readable medium of claim 9, wherein the signal is not transmitted upon a determination that the difference between the first OD response data and the second OD response data does not exceed the predetermined threshold.

12. The computer readable medium of claim 9, wherein generating the first and second OD response data comprises applying an ink model to the ink deposition data.

13. The computer readable medium of claim 12, wherein the ink model comprises a Weibull distribution function.

14. The computer readable medium of claim 9, wherein generating the first and second OD response data further comprises:
    receiving uncalibrated ink deposition data;
    receiving a transfer function; and
    performing a direct conversion of the uncalibrated ink deposition data to generate calibrated ink deposition data by applying the transfer function to the uncalibrated ink deposition.

15. A method comprising:
    receiving first ink deposition data representing an output ink amount versus a first input digital count for each of a plurality of color planes in a first halftone design;
    receiving second ink deposition data representing a second output ink amount versus a second input digital count for each of the plurality of color planes in a second halftone design;
    generating first optical density (OD) response data for each of the plurality of color planes based on the first ink deposition data, wherein the first OD response data represents a first OD value versus the first input digital count for the first halftone design;
    generating second OD response data for each of the plurality of color planes based on the second ink deposition data, wherein the second OD response data represents a second OD value versus the second input digital count for the second halftone design;
    determining whether a difference between the first OD response data and the second OD response data exceeds a predetermined threshold; and transmitting a signal upon a determination that the difference between the first OD response data and the second OD response data exceeds the predetermined threshold.

16. The method of claim 15, further comprising generating the first and second ink deposition data.

17. The method of claim 15, wherein the signal is not transmitted upon a determination that the difference between the first OD response data and the second OD response data does not exceed the predetermined threshold.

18. The method of claim 15, wherein generating the first and second OD response data comprises applying an ink model to the ink deposition data.

19. The method of claim 18, wherein the ink model comprises a Weibull distribution function.

20. The method of claim 19, wherein generating the first and second OD response data further comprises:
    receiving uncalibrated ink deposition data;
    receiving a transfer function; and
    performing a direct conversion of the uncalibrated ink deposition data to generate calibrated ink deposition data by applying the transfer function to the uncalibrated ink deposition.

* * * * *